(12) United States Patent
Kim et al.

(10) Patent No.: US 10,470,108 B2
(45) Date of Patent: Nov. 5, 2019

(54) SIGNAL TRANSMISSION AND RECEPTION METHOD BY REMOTE UE IN A WIRELESS COMMUNICATION SYSTEM AND DEVICE FOR SAME

(71) Applicant: LG Electronics Inc., Seoul (KR)

(72) Inventors: Laeyoung Kim, Seoul (KR); Youngdae Lee, Seoul (KR); Sunghoon Jung, Seoul (KR); Jaewook Lee, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 15/752,036

(22) PCT Filed: Aug. 16, 2016

(86) PCT No.: PCT/KR2016/008984
§ 371 (c)(1),
(2) Date: Feb. 12, 2018

(87) PCT Pub. No.: WO2017/026872
PCT Pub. Date: Feb. 16, 2017

(65) Prior Publication Data
US 2019/0215762 A1    Jul. 11, 2019

Related U.S. Application Data

(60) Provisional application No. 62/204,447, filed on Aug. 13, 2015.

(51) Int. Cl.
*H04W 48/16* (2009.01)
*H04W 76/30* (2018.01)
(Continued)

(52) U.S. Cl.
CPC .......... *H04W 48/16* (2013.01); *H04B 17/327* (2015.01); *H04W 8/005* (2013.01);
(Continued)

(58) Field of Classification Search
CPC .... H04B 17/327; H04W 48/16; H04W 76/30; H04W 76/27; H04W 76/10; H04W 8/005; H04W 8/02; H04W 88/02
See application file for complete search history.

(56) References Cited

U.S. PATENT DOCUMENTS

| | | |
|---|---|---|
| 2014/0349570 A1 | 11/2014 | Pan et al. |
| 2015/0029866 A1 | 1/2015 | Liao et al. |
| 2017/0251416 A1* | 8/2017 | Drevon ................. H04W 76/20 |

FOREIGN PATENT DOCUMENTS

| | | |
|---|---|---|
| WO | 2014182057 A1 | 11/2014 |
| WO | 2015026111 A1 | 2/2015 |

OTHER PUBLICATIONS

"3rd Generation Partnership Project; Technical Specification Group Core Network and Terminals; Non-Access-Stratum (NAS) functions related to Mobile Station (MS) in idle mode (Release 13)," 3GPP TS 23-122 V13.2.0 (Jun. 2015).

* cited by examiner

*Primary Examiner* — Ian N Moore
*Assistant Examiner* — Brian T Le
(74) *Attorney, Agent, or Firm* — Dentons US LLP

(57) ABSTRACT

A signal transmission and reception method by a remote user equipment (UE) in a wireless communication system, according to an embodiment of the present invention, comprises the steps of: determining a relay discovery; transmitting a first tracking area update (TAU) request, which comprises relay-related information, to a mobility management entity (MME); and, as a response to the first TAU
(Continued)

request, receiving a TAU acceptance and performing non-access-stratum (NAS) deactivation.

9 Claims, 9 Drawing Sheets

(51) Int. Cl.
*H04W 8/00* (2009.01)
*H04W 76/27* (2018.01)
*H04B 17/327* (2015.01)
*H04W 76/10* (2018.01)
*H04W 88/02* (2009.01)
*H04W 8/02* (2009.01)

(52) U.S. Cl.
CPC .............. *H04W 8/02* (2013.01); *H04W 76/10* (2018.02); *H04W 76/27* (2018.02); *H04W 76/30* (2018.02); *H04W 88/02* (2013.01)

# SIGNAL TRANSMISSION AND RECEPTION METHOD BY REMOTE UE IN A WIRELESS COMMUNICATION SYSTEM AND DEVICE FOR SAME

This application is a 35 USC § 371 National Stage entry of International Application No. PCT/KR2016/008984 filed on Aug. 16, 2016, which claims priority to U.S. Provisional Application No. 62/204,447 filed on Aug. 13, 2015, all of which are incorporated by reference in their entirety herein.

TECHNICAL FIELD

The following description relates to a wireless communication system and, more particularly, to a method and apparatus for transmitting and receiving a signal by a remote UE connected to a UE-to-network relay.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DETAILED DESCRIPTION OF THE INVENTION

Technical Problems

An object of the present invention is to provide processing a TAU procedure when a UE establishes connection with a UE-to-network relay.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method of transmitting and receiving a signal by a remote user equipment (UE) in a wireless communication system, including determining to perform relay discovery; transmitting a first tracking area update (TAU) request message including relay-related information to a mobility management entity (MME); and receiving a TAU accept message as a response to the first TAU request message and deactivating a non-access stratum (NAS).

In another aspect of the present invention, provided herein is a remote user equipment (UE) in a wireless communication system, including a transceiver; and a processor, wherein the processor is configured to determine to perform relay discovery, transmit a first tracking area update (TAU) request message including relay-related information to a mobility management entity (MME), receive a TAU accept message as a response to the first TAU request message, and deactivate a non-access stratum (NAS).

If the NAS is deactivated, a TAU request message may not be generated even when a periodic TAU timer expires.

The first TAU request message may indicate a UE context of the MME is prohibited from being deleted.

The method may further include performing relay discovery; and establishing connection with a selected relay after performing relay discovery.

The method may further include activating the deactivated NAS when the remote UE determines to release connection to a relay with which connection of the remote UE has been established.

The method may further include transmitting a second TAU request message to the MME after activating the deactivated NAS.

The second TAU request message may include one or more of information indicating that a network connection service that the remote UE has received through the selected relay has been ended, information indicating that the remote UE receives/has received a service directly from a network, information indicating that the remote UE desires to perform normal periodic TAU (or location update), information indicating that the remote UE has entered network coverage or the remote UE is connectable to the network, information indicating that the remote UE is served/has been served by an evolved universal terrestrial radio access network (E-UTRAN), information indicating that the remote UE does not operate/has not operated as a remote UE, and information about a time value used to perform periodic TAU, i.e., information about a time value until next periodic TAU is performed.

The relay-related information may include one or more information indicating that the remote UE receives a network connection service through the selected relay, information indicating that the remote UE performs periodic TAU of a cycle of a preset value or more, information indicating that the remote UE is out of network coverage, information indicating that the remote UE is not served by an evolved universal terrestrial radio access network (E-UTRAN), information requesting that a network maintain a UE context, information requesting that the network not detach the remote UE, and information about a time value until next periodic TAU is performed.

The information about the time value until the next periodic TAU is performed may be set to have an infinite value.

The determining to perform relay discovery may be performed when a reference signal received power (RSRP) measurement value is less than a threshold included in system information block type 19 (SIB19).

The method may further include determining to release connection to a relay when the RSRP measurement value is larger than the threshold.

Advantageous Effects

According to the present invention, an unnecessary radio operation capable of occurring when a UE establishes connection with a UE-to-network relay can be prevented from being performed and service continuity can be ensured.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
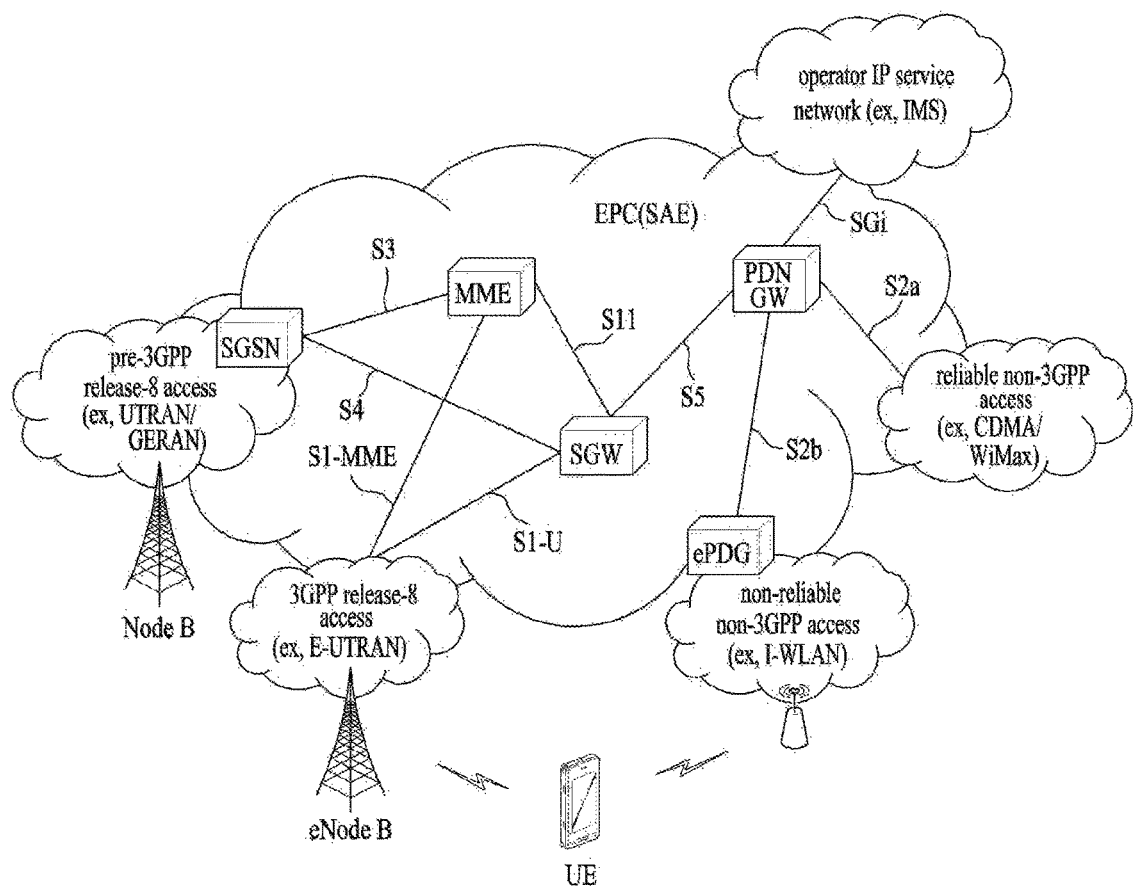
FIG. 1 is a schematic diagram showing the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/ communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-network relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-network relay without service from E-UTRAN in a UE-to-network relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC(SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/ GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
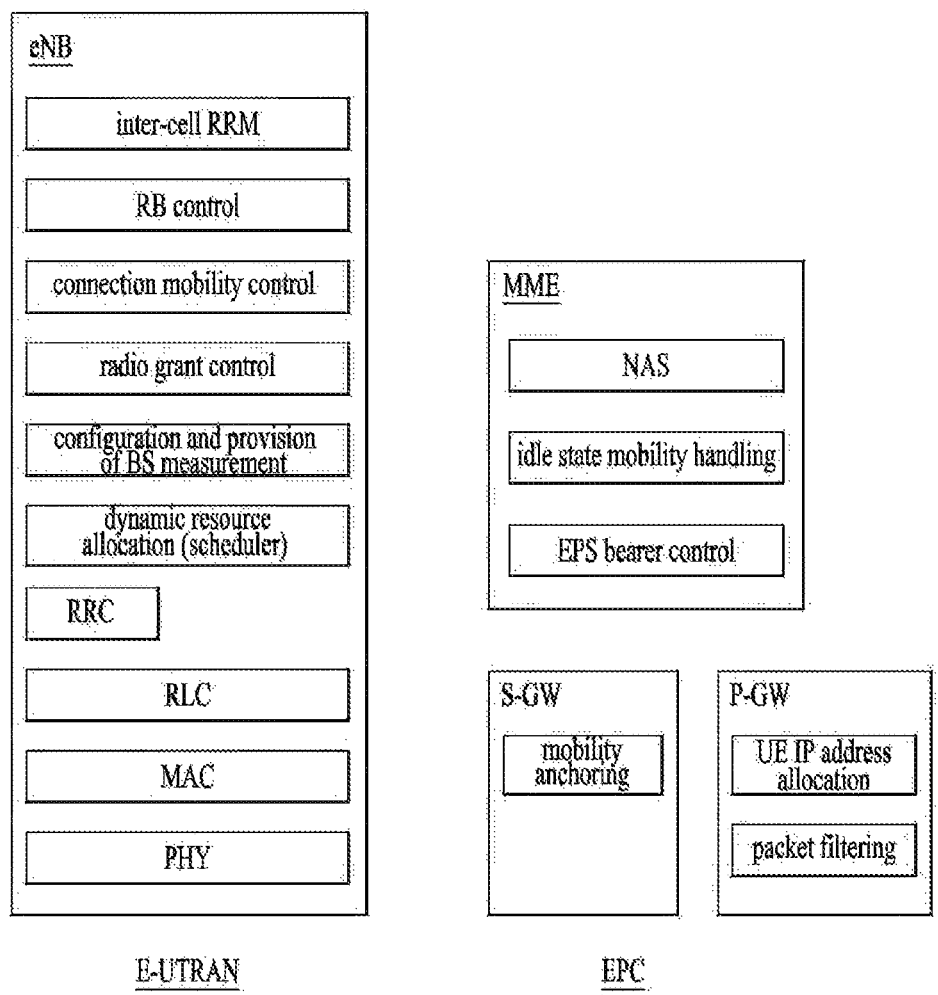
FIG. 2 is a diagram exemplarily illustrating architectures of a typical E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
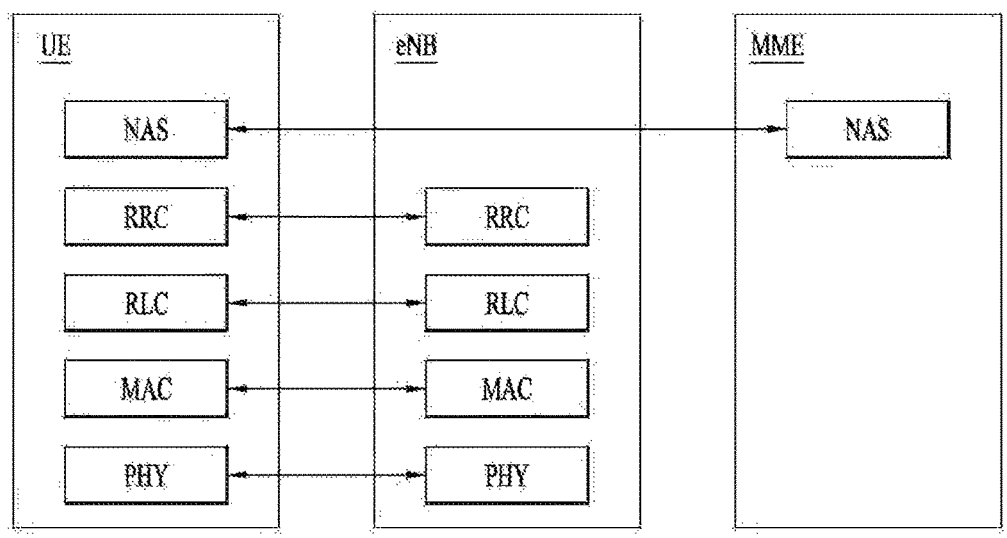
FIG. 3 is a diagram exemplarily illustrating the structure of a radio interface protocol in a control plane.
Figure 4:
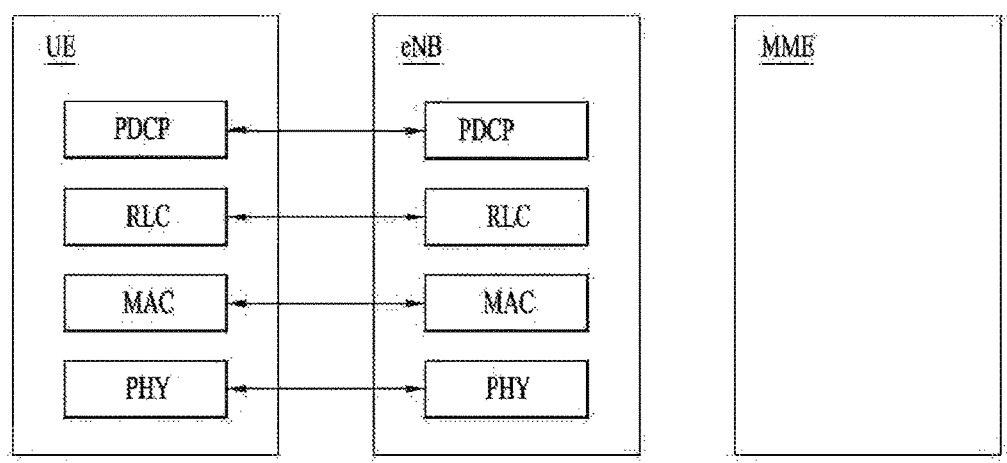
FIG. 4 is a diagram exemplarily illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
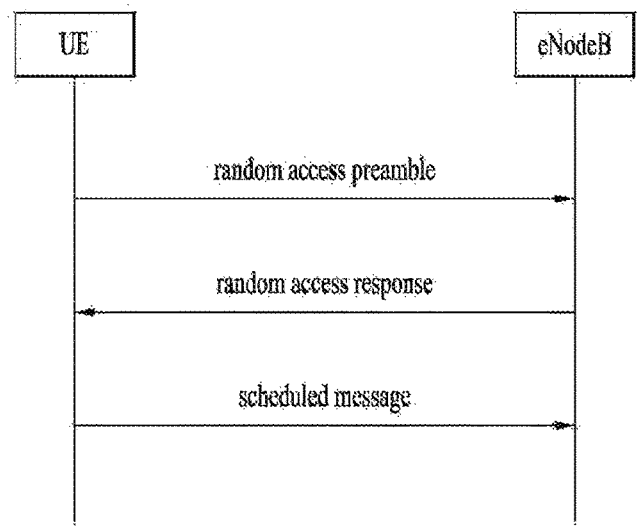
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
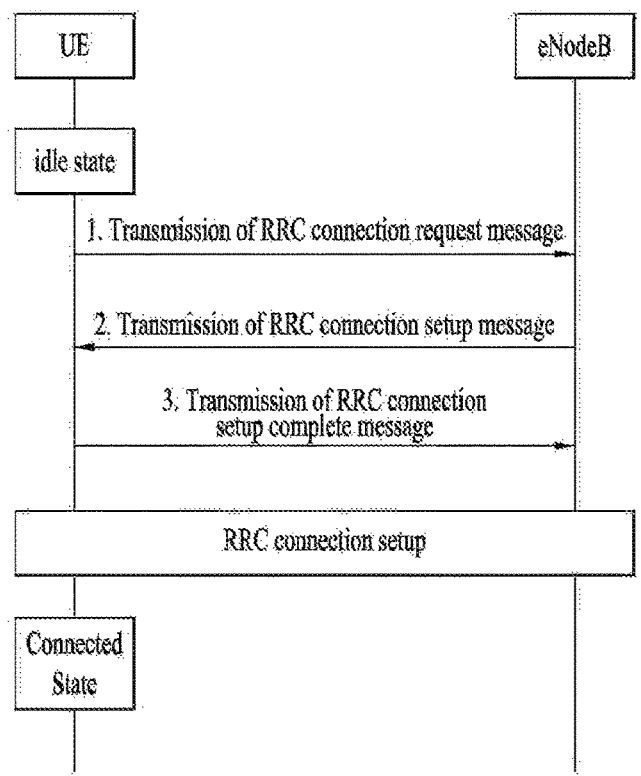
FIG. 6 illustrates a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

ProSe (Proximity Service)

ProSe refers to a service for enabling discovery and mutual direct communication between physically adjacent devices, communication via an eNodeB, or communication via a third device.

Figure 7:
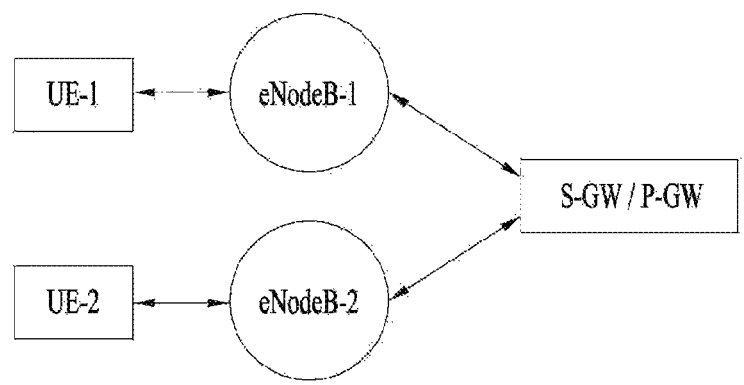
FIG. 7 illustrates a data path through an EPS.

FIG. 7 illustrates a default data path for communication between two UEs in an EPS. The default data path passes through an eNodeB and a core network (i.e., an EPC) managed by an operator. In the present invention, such a default data path may be referred to as an infrastructure data path (or an EPC path). In addition, communication via the infrastructure data path may be referred to as infrastructure communication.

Figure 8:
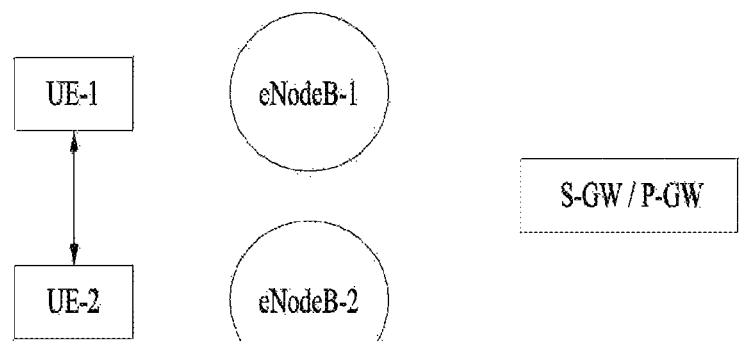
FIGS. 8 and 9 illustrate data paths in a direct mode.

FIG. 8 illustrates a direct mode data path between two UEs based on ProSe. Such a direct mode communication path does not pass through the eNodeB and a core network (i.e., an EPC) managed by an operator. FIG. 8(a) illustrates the case in which UE-1 and UE-2 camp on different eNodeBs and exchange data through a direct mode communication path. FIG. 8(b) illustrates the case in which UE-1 and UE-2 camp on the same eNodeB and exchange data through a direct mode communication path.

Figure 9:
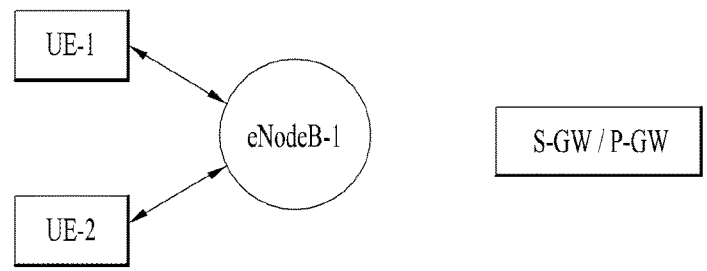

FIG. 9 illustrates a locally routed data path between two UEs via an eNodeB based on ProSe. This communication path via the eNodeB does not pass through a core network (e.g., an EPC) managed by an operator.

Figure 10:
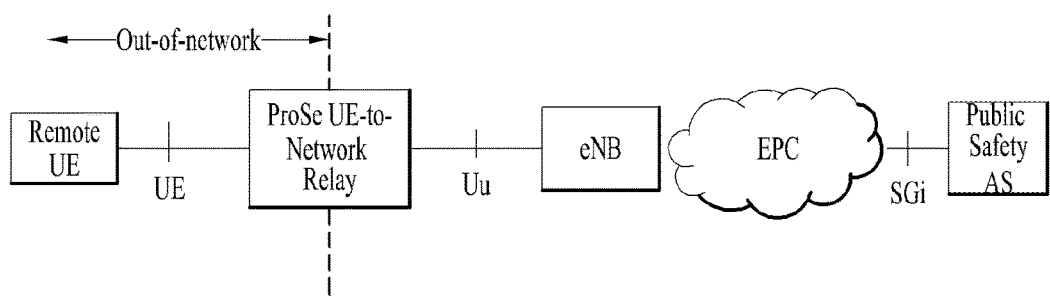
FIG. 10 illustrates the case in which a UE receives a connection service to a network through a ProSe UE-to-network relay.

FIG. 10 illustrates the case in which a UE (remote UE) which is out of network coverage (i.e., which is not served by an E-UTRAN) receives a connection service to a network through a ProSe UE-to-network relay. For more details, refer to 3GPP TR 23.713 and TS 23.303, the contents of which are incorporated in the present disclosure. Among UEs participating in a public safety service for connection to the network through the UE-to-network relay, a representative UE may be a mission critical push-to-talk (MCPTT) UE. According to Section 5.1 of 3GPP TS 23.179 v0.2.0, it is recommended that the MCPTT UE discover and connect to a UE-to-network relay prior to going out of E-UTRAN coverage in order to support service continuity, rather than the MCPTT UE discovering a UE-to-network relay which is to provide a network connection service thereto after completely exiting network coverage, i.e., E-UTRAN coverage. In addition, for user/UE experience, it is under discussion in 3GPP that a UE discovers for a UE-to-network relay and receives a service from the UE-to-network relay in the case in which it is determined that the UE has difficulty in further receiving a service from a network because, for example, radio quality of the network is lowered by a predetermined level or less, even when the UE is not out of E-UTRAN coverage.

As described above, if the remote UE starts to receive a network connection service through the UE-to-network relay, UL traffic to the network and DL traffic from the network are transmitted not through an EPC and an eNodeB but through the UE-to-network relay. Then, the remote UE need not perform tracking area update (TAU) which is a periodic mobility management (MM) operation performed with respect to the network (especially, an MME). Particularly, if the remote UE exits from network coverage, it is impossible to transmit a NAS message to the MME through the eNodeB and, therefore, the remote UE cannot (or does not need to) perform the TAU operation.

In this case, loss occurs in terms of execution of an unnecessary radio operation and service continuity.

More specifically, the case of execution of an unnecessary radio operation will now be described. Even after the remote UE is connected to the UE-to-network relay, a periodic TAU timer which resumes after a previous TAU operation is performed continues to run. If the RAU timer expires, a NAS layer generates a TAU request message and transmits the TAU request message to an access stratum (AS) layer. Then, the AS layer of the remote UE tries to establish an RRC connection in order to transmit a NAS message to the network. However, since the remote UE has already been out of network coverage or an LTE-Uu signal transmitted to the network is weak, there is a high probability that such an RRC connection setup operation is impossible. Nonetheless, the remote UE performs an unnecessary radio operation with respect to the network.

Figure 11:
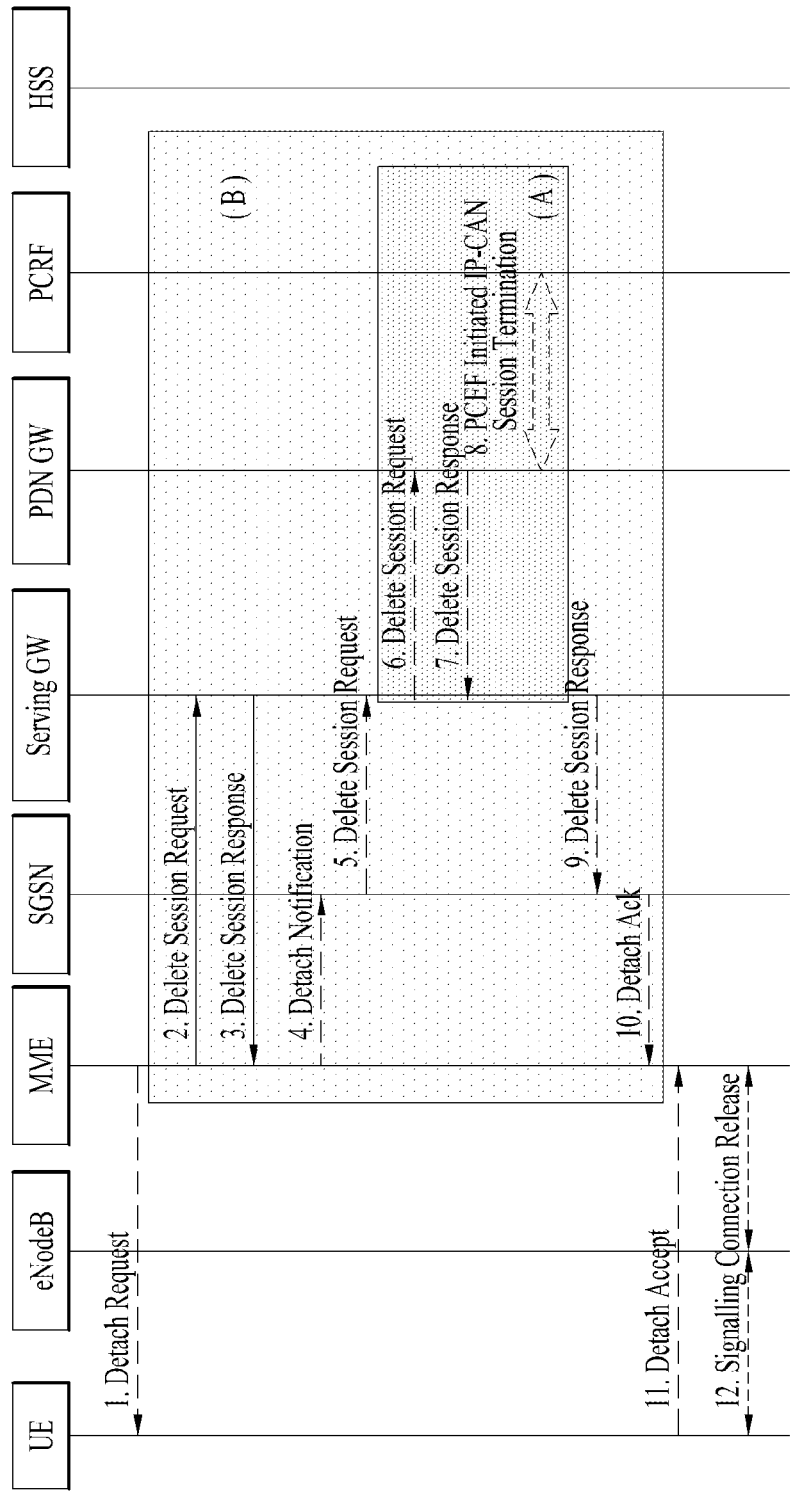
FIG. 11 illustrates a detach procedure.

In terms of service continuity, if the UE does not perform TAU within a predetermined time (for details, refer to Section 4.3.5.2 of TS 3GPP TS 23.401), the MME may determine that the UE is no longer reachable based on a reachability management mechanism. That is, if an implicit detach timer expires before the UE contacts the network, the MME detaches the UE. (A detach procedure is illustrated in FIG. 11 and a detailed description thereof is disclosed in Section 5.3.8.3 of TS 23.401. If necessary, the contents disclosed in Section 5.3.8.3 of TS 23.401 may be used as the contents of the present disclosure). Thus, as the UE receives a network connection service through the UE-to-network relay, if the network detaches the UE, the UE should perform an attach procedure later when the UE desires to receive a service directly from the network (e.g., when the UE again enters the network coverage or radio quality of a signal transmitted to the network becomes better). Since the attach procedure consumes some time in the process of generating a UE context and establishing a PDN connection even in a gateway (S-GW or a P-GW) as well as in an MME of the network, service continuity may be restrictively applied to the UE which desires to receive a service directly from the network.

Accordingly, a signal transmission and reception method of a UE and an operation of an MME according to embodiments of the present invention, capable of solving the aforementioned problems, will be described hereinbelow.

The UE (remote UE) may determine to perform relay discovery and transmit a first TAU request message including relay-related information to the MME. The UE may receive a TAU accept message as a response to the first TAU request message and deactivate a NAS. Herein, if the NAS is deactivated, a TAU request message may not be generated even when a periodic TAU timer is ended. Deactivation of the NAS may correspond to deactivation of only an operation of an MME among operations of the NAS.

The relay-related information may include one or more of a) information indicating that the UE receives/has received a network connection service through a UE-to-network relay, b) information indicating that the UE desires to perform periodic TAU (or location update) of a long cycle, c) information indicating that the UE is/has been out of network coverage, d) information indicating that the UE is/has not been served by an E-UTRAN, e) information indicating that the UE operates/has operated as a remote UE, information requesting that the network maintain (not delete) UE-related information (or UE context), g) information requesting that the network not detach the UE, and h) information about a time value used to perform periodic TAU, i.e., information about a time value until next periodic TAU is performed (this information may indicate an actual time value, for example, 5 hours, or an infinite value). A predefined information element (IE) and/or a new IE may be defined to include this information in the TAU request message. The predefined IE may use, for example, a T3412 extended value, T3324 value, etc. Although the TAU operation has been described hereinabove, the information may be indicated to the network through other operations. In this case, a message transmitted to the MME may include a newly defined NAS message or a conventional NAS message. Even when the UE receives a network connection service through the UE-to-network relay, the UE may maintain a TAI list upon receiving a service directly from the network. The first TAU operation may be performed 1) before the UE discovers the UE-to-network relay, 2) after the UE discovers the UE-to-network relay, 3) after the UE selects the UE-to-network relay, 4) after the UE establishes one-to-one communication (or layer 2 link) with the UE-to-network relay, 5) after the UE acquires an IP address from the UE-to-network relay, or 6) after the UE receives an ECGI from the UE-to-network relay. Alternatively, the UE may perform the TAU operation while performing the above operation. The UE may perform the TAU operation only when the UE can be directly connected to the network at a timing when the UE should perform the TAU operation.

Upon receiving the TAU request message including the above-described relay-related information, the MME transmits a TAU accept message to the UE. In this case, the MME may include, in the TAU accept message, one or more of A) information indicating that the MME has recognized that the UE receives/has received (or the MME permits the UE to receive) the network connection service through the UE-to-network relay, B) information indicating that the MME has recognized that the UE desires to perform (or the MME permits the UE to perform) periodic TAU (or location update) of a long cycle or extended periodic TAU (or location update), C) information indicating that the MME has recognized that the UE is/has been (or the MME permits the UE to be) out of network coverage, D) information indicating that the MME has recognized that the UE is not/has not been (or the MME permits the UE not to be) served by the E-UTRAN, E) information indicating that the MME has recognized that the UE operates/has operated (or the MME permits the UE to operate) as the remote UE, F) information indicating that the UE-related information (or UE context) is maintained (or is not deleted), G) information indicating that the UE is not detached, and H) information about a time value used to perform periodic TAU, i.e., information about a time value until next period TAU is performed (this information may indicate an actual time value, for example, 5 hours, or an infinite value). This information may be signaled explicitly, implicitly, or implicatively. A predefined IE and/or a new IE may be defined in order to include the information in the TAU accept message. The predefined IE may use, for example, a T3412 extended value, a T3324 value, etc. The MME may transmit the information in a response message after receiving a NAS message from the UE or transmit the information to the UE by recognizing that the UE receives a service through the UE-to-network relay. In this case, the MME may recognize that the UE receives a service through the UE-to-network relay, by itself or based on a message/information received/acquired from other network nodes (e.g., eNodeB, GW, and HSS). Additionally, the MME may cause an S-GW/P-GW to perform an operation of releasing PDN connection to the UE. That is, the MME may cause the GW to delete a UE-related resource while maintaining a context for the UE. Instead of requesting that the GW release PDN connection or delete the UE related resource as described above, the MME may request the GW suspend PDN connection. Then, even when the P-GW receives DL traffic transmitted to the UE, the P-GW may delete the DL traffic instead of transmitting the DL traffic to the S-GW.

That is, upon receiving the TAU accept message as a response to the TAU request message including the above-described relay-related information, the UE may deactivate the NAS so that an unnecessary radio operation which is capable of occurring in a situation in which TAU cannot be properly transmitted.

The first TAU request message may indicate that the UE context of the MME is prohibited from being deleted. Alternatively, upon receiving the first TAU request message, the MME may configure the UE context not to be deleted or may not delete the UE context.

When the remote UE determines that connection to a relay with which connection of the remote UE has been established should be released, the deactivated NAS may be activated. After activating the NAS, the remote UE may transmit a second TAU request message to the MME.

The second TAU request message includes one or more of a) information indicating that a network connection service that the UE has received through the UE-to-network relay has been ended/is ended, b) information indicating that the UE receives/has received a service directly from the network, c) information indicating that the UE desires to perform normal cycle TAU (or location update) or normal periodic TAU (or location update), d) information indicating that the UE has entered network coverage or the UE is connectable to the network, e) information indicating that the UE is served/has been served by the E-UTRAN, f) information indicating that the UE does not operate/has not operated as the remote UE, and g) information about a time value used to perform periodic TAU, i.e., information about a time value until next periodic TAU is performed.

A predefined information element (IE) and/or a new IE may be defined to include this information in the TAU request message. The predefined IE may include, for example, a T3412 extended value. A timing when the TAU operation is performed may be before the UE disconnects one-to-one communication (or layer 2 link) with the UE-to-network relay or after UE disconnects one-to-one communication (or layer 2 link) with the UE-to-network relay. Alternatively, the UE may perform TAU while performing the above operation. In addition, when a condition for performing TAU is satisfied, the UE may perform the TAU operation. That is, if the UE is located in an area other than a TAI list or should perform a periodic TAU operation, this means that the UE does not perform the TAU operation at a timing when the UE determines or starts to receive a service (or PDN connection service) directly from the network.

Upon receiving the second TAU request message from the UE, the MME transmits a TAU accept message to the UE. In this case, the MME may include, in the TAU accept message, one or more of A) information indicating that the MME has recognized that the network connection service that the UE has received through the UE-to-network relay has been ended (or the MME permits the UE to end the network connection service), B) information indicating that the MME has recognized that the UE receives/has received (or MME permits the UE to receive) a service directly from the network, C) information indicating that the MME has recognized that the UE desires to perform (or the MME permits the UE to perform) normal cycle TAU (or location update) or normal periodic TAU (or location update), D) information indicating that the MME has recognized that the UE has entered network coverage or is connectable to the network (or the MME permits the UE to enter network coverage), E) information indicating that the MME has recognized that the UE is/has been (or the MME permits the UE to be) served by the E-UTRAN, F) information indicating that the MME has recognized that the UE does not operate/has not operated (or the MME permits the UE to operate) as the remote UE, and G) information about a time value used to perform periodic TAU, i.e., information about a time value until next period TAU is performed. This information may be signaled explicitly, implicitly, or implicatively. A predefined IE and/or a new IE may be defined to include this information in the TAU accept message. The predefined IE may use, for example, a T3412 extended value, etc. The MME may transmit the information in a response message after receiving a NAS message from the UE or transmit the information to the UE by recognizing that the UE receives a service directly from the network. In this case, the MME may recognize that the UE receives a service directly from the network, by itself or based on a message/information received/acquired from other network nodes (e.g., eNodeB, GW, and HSS). If the MME which has received the first TAU request message has requested that the GW release PDN connection, the MME may cause the S-GW/P-GW to perform an operation of generating PDN connection. That is, the MME may cause the GW to generate a UE-related resource. If the MME which has received the first TAU request message has requested that the GW suspend PDN connection, the MME may request that the S-GW/P-GW resume PDN connection.

Figure 12:
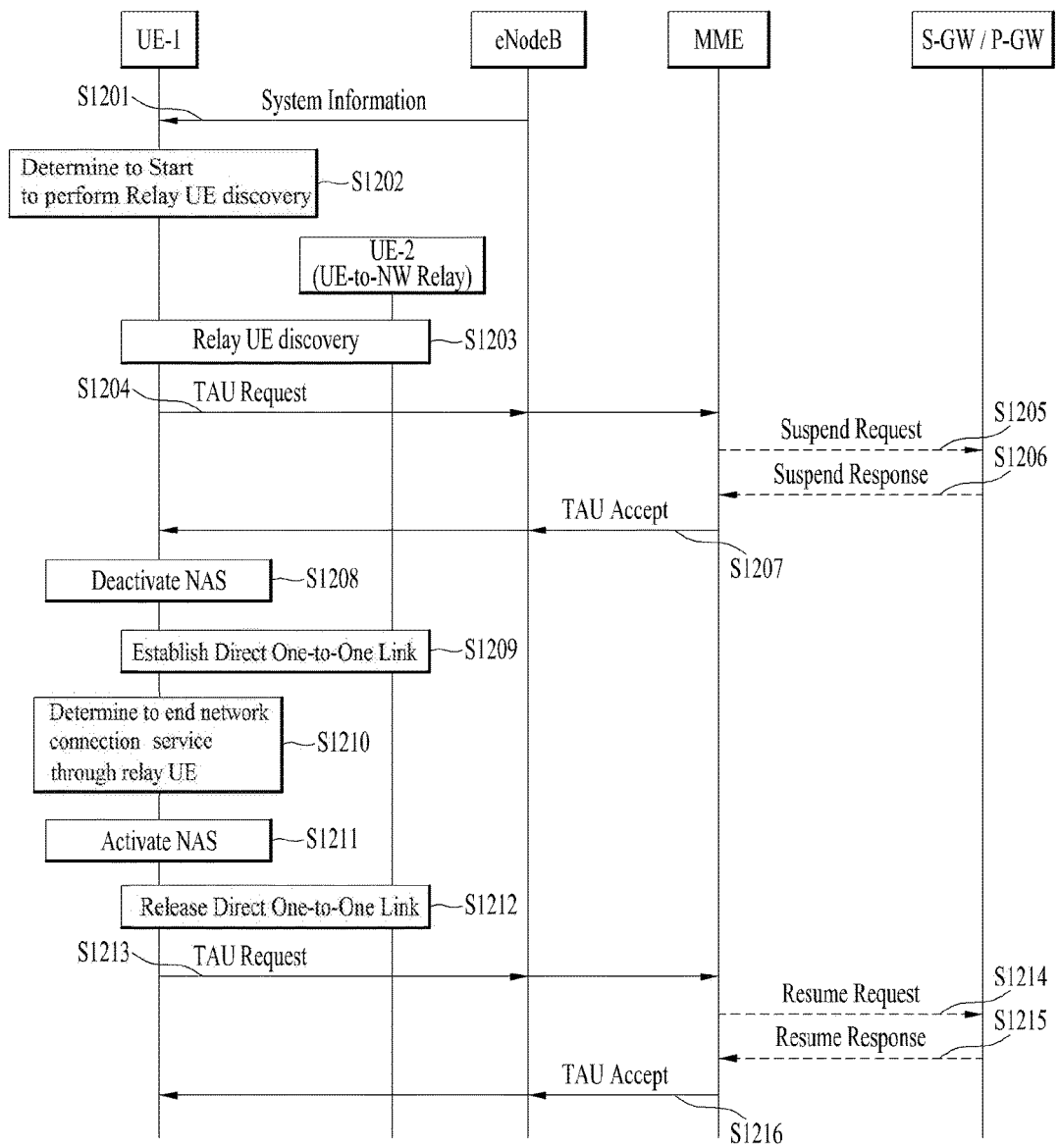
FIG. 12 is a diagram illustrating a signal transmission and reception procedure according to an embodiment of the present invention.

Hereinafter, a signaling operation between a UE and a network entity according to an embodiment of the present invention will be described with reference to FIG. 12.

In step S1201, UE-1 receives ProSe-related system information from an eNB. The system information may be system information block type 19 (SIB19) related to a relay operation and may be information indicating that the UE determines to use a UE-to-network relay when a reference signal received power (RSRP) measurement value of a cell (a cell on which the UE camps in an RRC_Idle state of the UE or a PCell in RRC-Connected state of the UE) is lowered than a threshold or less, as indicated in Table 2.

TABLE 2

```
SL-DiscConfigRemoteUE-r13   ::= SEQUENCE {
    threshHigh-r13              RSRP-RangeSL4-r13
    OPTIONAL,       -- Need OR
    hystMax-r13                 ENUMERATED
                                {dB0, dB3, dB6,
                                dB9, dB12}
    OPTIONAL,       -- Cond ThreshHigh
    reselectionInfoIC-r13       ReselectionInfoRelay-r13}
```

In step S1202, since the RSRP measurement value of a cell is less than the threshold indicated by SIB19, UE-1 determines to receive a network connection service through a UE-to-network relay. Therefore, UE-1 determines to start to perform an operation of discovering a relay. In step S1203, UE-1 performs a relay discovery operation. For more details of the related operation, refer to the contents specified in Section 5.4.4 (direct communication via ProSe UE-to-network relay) of TS 23.303. In step S1204, UE-1 transmits a TAU request message to an MME. Herein, the TAU request message corresponds to the above-described first TAU request message and a detailed description of the TAU request message is replaced with the above description.

In step S1205, upon receiving the TAU request message from UE-1, the MME transmits, to an S-GW/P-GW, a suspend request message for suspending PDN connection to UE-1. In step S1206, the P-GW transmits a suspend response message to the MME through the S-GW. In step S1207, the MME transmits a TAU accept message to UE-1. A detailed description of steps S1205 to S1207 is replaced with the description of the MME which has received the first TAU request message described previously.

In step S1208, upon receiving the TAU accept message from the MME, UE-1 deactivates a NAS. Herein, UE-1 may deactivate only an MM operation among operations of the NAS. In step S1209, UE-1 selects UE-2 as a UE-to-network relay as a result of relay discovery and establishes a direct link with UE-2. For more details, refer to Section 5.4.4 (direct communication via ProSe UE-to-network relay) of TS 23.303.

Steps S1204 to S1208 may be performed prior to step S1203 or after step S1209. Step S1203 or step S1209 may be simultaneously performed.

In step S1210, since strength of a signal with a network becomes better, i.e., since the RSRP measurement value of the cell is higher than the threshold indicated by SIB19, UE-1 determines to receive a service directly from the network. Therefore, UE-1 determines to end reception of the network connection service provided from the UE-to-network relay. In step S1211, UE-1 activates the NAS. If UE-1 has deactivated only MM among operations of the NAS in step S1208, UE-1 activates MM. In step S1212, UE-1 releases a direct link with UE-2. For more details, refer to Section 5.4.5.4 (layer-2 link release over PC5) of TS 23.303. In step S1213, UE-1 transmits a TAU request message to the MME. Herein, the TAU request message corresponds to the above-described second TAU request message and a detailed description thereof is replaced with the above-described contents.

Upon receiving the TAU request message from UE-1, the MME transmits, to the S-GW/P-GW, a resume request message for resuming PDN connection to UE-1 in step S1214. In step S1215, the P-GW transmits a resume response message to the MME through the S-GW.

In step S1216, the MME transmits a TAU accept message to UE-1.

Meanwhile, the following embodiment may be used as a method capable of obtaining effects similar to the above-described embodiments while not affecting the operation of the MME. The UE discovers a UE-to-network relay to establish a direct one-to-one link. If a periodic TAU timer which has run after the UE (remote UE) ends a TAU procedure expires, the remote UE transmits a TAU request message to an AS layer from a NAS layer to perform the TAU procedure.

Upon receiving, from the NAS layer of the remote UE, the TAU request message corresponding to NAS signaling which should be transmitted to a network, the AS layer cannot detect an LTE-Uu signal (i.e. cannot discover a cell) and informs the NAS layer that network connection is impossible upon receiving a network connection service through a UE-to-network relay. Such information indicating that network connection is impossible may be information indicating that LTE-Uu is not available, the LTE-Uu signal is not detected or weak, or a cell is not found. In addition, the information may indicate that a NAS operation is not supported.

The NAS layer of the remote UE suspends a periodic TAU operation. That is, while receiving the network connection service from the UE-to-network relay, the UE does not attempt to perform the periodic TAU operation any longer.

Through the above-described procedure, an unnecessary radio operation of the remote UE can be removed while the operation of the MME is not affected.

Figure 13:
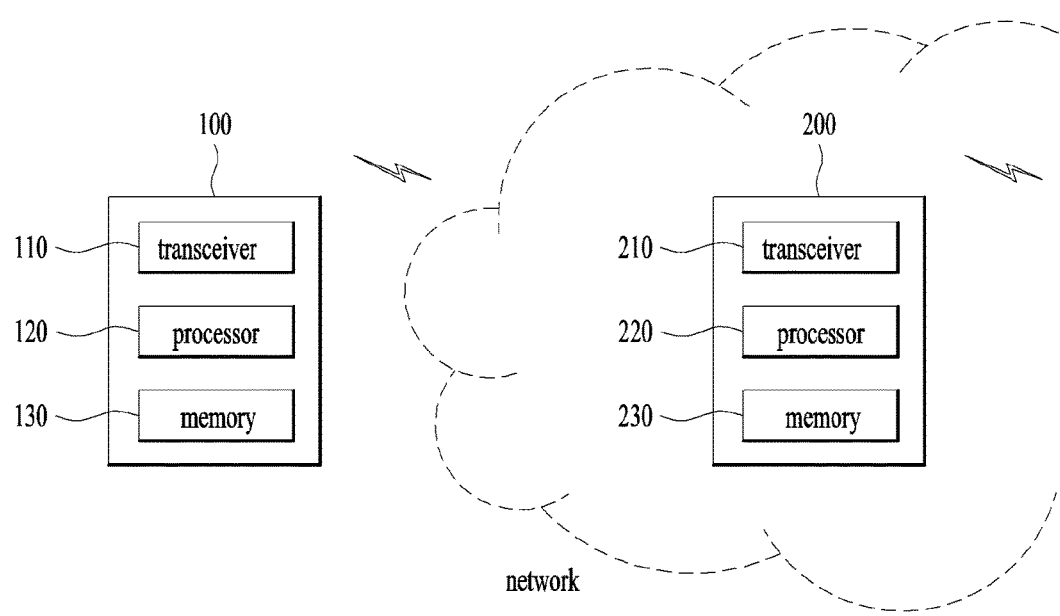
FIG. 13 is a diagram illustrating an exemplary configuration of a network node according to an embodiment of the present invention.

FIG. 13 is a diagram illustrating an exemplary configuration of a UE and a network node according to an embodiment of the present invention.

Referring to FIG. 13, a UE 100 according to the present invention may include a transceiver 110, a processor 120, and a memory 130. The transceiver 110 may be configured to transmit a variety of signals, data, and information to an external device and receive a variety of signals, data, and information from the external device. The UE 100 may be connected to the external device by wire or wirelessly. The processor 120 may control overall operation of the UE 100 and may be configured to perform a function for processing information transmitted from the UE 100 to the external device or from the external device to the UE 10. In addition, the processor 120 may be configured to perform operation of the UE 100 proposed in the present invention. The memory 130 may store the processed information for a predetermined time and may be replaced by a buffer (not shown).

Referring to FIG. 13, a network node 200 according to the present invention may include a transceiver 210, a processor 220, and a memory 230. The transceiver 210 may be configured to transmit a variety of signals, data, and information to the external device and receive a variety of signals, data, and information from the external device. The network node 200 may be connected to the external device by wire or wirelessly. The processor 220 may control overall operation of the network node 200 and may be configured to perform a function for processing information transmitted from the network node 200 to the external device or from the external device to the network node 200. In addition, the processor 120 may be configured to perform operation of the network node 200 proposed in the present invention. The memory 230 may store the processed information for a predetermined time and may be replaced by a buffer (not shown).

The detailed configurations of the UE 100 and the network node 200 may be implemented such that the above-described various embodiments of the present invention are independently performed or two or more embodiments of the present invention are simultaneously performed. Redundant matters will not be described herein for clarity.

The embodiments of the present invention may be implemented by various means, for example, hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have focused upon a 3GPP system as described above, the present invention is applicable to various mobile communication systems in the same manner.

The invention claimed is:

1. A method of transmitting and receiving a signal by a remote user equipment (UE) in a wireless communication system, the method comprising:
    making a determination to perform a relay discovery;
    transmitting a first tracking area update (TAU) request message including relay-related information to a mobility management entity (MME);
    receiving a TAU accept message as a response to the first TAU request message and deactivating a non-access stratum (NAS);
    performing the relay discovery;
    establishing a connection with a selected relay after performing the relay discovery;
    activating the deactivated NAS when the remote UE makes a determination to release the connection with the selected relay; and
    transmitting a second TAU request message to the MME after activating the deactivated NAS.

2. The method of claim 1, wherein if the NAS is deactivated, a TAU request message is not generated even when a periodic TAU timer expires.

3. The method of claim 1, wherein the first TAU request message indicates a UE context of the MME is prohibited from being deleted.

4. The method of claim 1, wherein the second TAU request message includes one or more of information indicating that a network connection service that the remote UE has received through the selected relay has ended, information indicating that the remote UE receives or has received a service directly from a network, information indicating that the remote UE desires to perform normal cycle TAU (or location update) or normal periodic TAU (or location update), information indicating that the remote UE has entered network coverage or the remote UE is connectable to the network, information indicating that the remote UE is served or has been served by an evolved universal terrestrial radio access network (E-UTRAN), information indicating that the remote UE does not operate or has not operated as a remote UE, and information about a time value used to perform periodic TAU, i.e., information about a time value until next periodic TAU is performed.

5. The method of claim 1, wherein the relay-related information includes one or more information indicating that the remote UE receives a network connection service through the selected relay, information indicating that the remote UE performs periodic TAU of a cycle of a preset value or more, information indicating that the remote UE is out of network coverage, information indicating that the remote UE is not served by an evolved universal terrestrial radio access network (E-UTRAN), information requesting that a network maintain a UE context, information requesting that the network not detach the remote UE, and information about a time value until next periodic TAU is performed.

6. The method of claim 5, wherein the information about the time value until the next periodic TAU is performed is set to have an infinite value.

7. The method of claim 1, wherein the determination to perform relay discovery is performed when a reference signal received power (RSRP) measurement value is less than a threshold included in system information block type 19 (SIB19).

8. The method of claim 7, further comprising:
    making the determination to release the connection with the selected relay when the RSRP measurement value is larger than the threshold.

9. A remote user equipment (UE) in a wireless communication system comprising:
    a transceiver; and
    a processor,
    wherein the processor is configured to:
    make a determination to perform relay discovery,
    control the transceiver to transmit a first tracking area update (TAU) request message including relay-related information to a mobility management entity (MME),
    control the transceiver to receive a TAU accept message as a response to the first TAU request message,
    deactivate a non-access stratum (NAS),
    perform the relay discovery,
    establish a connection with a selected relay after performing the relay discovery;
    activate the deactivated NAS when the processor makes a determination to release the connection with the selected relay; and control the transceiver to transmit a second TAU request message to the MME after activating the deactivated NAS.

\* \* \* \* \*